(12) United States Patent
Zhuang et al.

(10) Patent No.: US 11,681,374 B2
(45) Date of Patent: Jun. 20, 2023

(54) HAPTIC FEEDBACK SYSTEM

(71) Applicant: TDK TAIWAN CORP., Taoyuan (TW)

(72) Inventors: Po-Xiang Zhuang, Taoyuan (TW); Wei-Jhe Shen, Taoyuan (TW); Yi-Ho Chen, Taoyuan (TW); Ko-Lun Chao, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 0 days.

(21) Appl. No.: 17/649,333

(22) Filed: Jan. 28, 2022

(65) Prior Publication Data

US 2023/0144554 A1  May 11, 2023

Related U.S. Application Data

(60) Provisional application No. 63/276,237, filed on Nov. 5, 2021.

(51) Int. Cl.
| | |
|---|---|
| *G06F 3/01* | (2006.01) |
| *H02K 11/215* | (2016.01) |
| *H02K 33/18* | (2006.01) |
| *G02B 27/64* | (2006.01) |

(52) U.S. Cl.
CPC ............ *G06F 3/016* (2013.01); *G02B 27/646* (2013.01); *H02K 11/215* (2016.01); *H02K 33/18* (2013.01)

(58) Field of Classification Search
CPC ..... G06F 3/016; G02B 27/646; H02K 11/215; H02K 33/18
See application file for complete search history.

(56) References Cited

U.S. PATENT DOCUMENTS

| | | | |
|---|---|---|---|
| 2017/0070131 A1* | 3/2017 | Degner | H02K 33/00 |
| 2018/0021812 A1* | 1/2018 | Akanuma | H02K 33/00 |
| | | | 310/25 |

\* cited by examiner

*Primary Examiner* — Premal R Patel
(74) *Attorney, Agent, or Firm* — Muncy, Geissler, Olds & Lowe, P.C.

(57) ABSTRACT

A haptic feedback system is disposed on a device, including a fixed portion, a movable portion, a connecting assembly, and a driving assembly. The fixed portion fixedly connects the device. The movable portion is movable along a first mode direction and a second mode direction relative to the fixed portion. The movable portion is movably connected to the fixed portion via the connecting assembly. The driving assembly drives the movable portion to move relative to the fixed portion by a driving force, wherein a driving direction of the driving force is different from the first mode direction and the second mode direction.

21 Claims, 5 Drawing Sheets

HAPTIC FEEDBACK SYSTEM

CROSS-REFERENCE TO RELATED APPLICATIONS

The present application claims priority to U.S. Provisional Patent Application No. 63/276,237, filed May 11, 2021, which are incorporated by reference herein in their entirety.

BACKGROUND OF THE DISCLOSURE

Field of the Disclosure

The present invention relates to a haptic feedback system, and, in particular, to a haptic feedback system having different modes of vibration.

Description of the Related Art

With the advancement of technology, the application of electronic devices is becoming more and more common. This is especially true for consumer electronic products, such as mobile phones, wearable devices, etc., which have gradually become indispensable parts of daily life. These electronic devices usually have a vibrating function, for example, to notify the user or to enhance the user's experience when using the electronic device. However, the existing haptic feedback system cannot effectively realize different mode of vibrations, and the current trends have higher and higher requirements on the size of electronic devices, meaning that the existing haptic feedback systems have much room for improvement.

BRIEF SUMMARY OF THE DISCLOSURE

Therefore, in this embodiments of the present disclosure, a haptic feedback system is provided, the structure of which can cause the movable portion to move in the first mode direction or the second mode direction by the driving force along the same driving direction.

An embodiment of the invention provides a haptic feedback system is disposed on a device, including a fixed portion, a movable portion, a connecting assembly, and a driving assembly. The fixed portion fixedly connects the device. The movable portion is movable along a first mode direction and a second mode direction relative to the fixed portion. The movable portion is movably connected to the fixed portion via the connecting assembly. The driving assembly drives the movable portion to move relative to the fixed portion by a driving force, wherein a driving direction of the driving force is different from the first mode direction and the second mode direction.

According to some embodiments of the present disclosure, the fixed portion includes an upper cover and a base, the upper cover has a first surface, a second surface, a third surface, a fourth surface, and a top surface, and the top surface is rectangular, and has a length and a width, and the first surface, the second surface, the third surface, and the fourth surface have a height and extend from the top surface toward the base along a first direction. The height is less than the length and the width. The first surface is opposite to the third surface, and the second surface is opposite to the fourth surface. The movable portion includes a main body, which is disposed inside the upper cover and has a first side, a second side, a third side, a fourth side, a first recessed portion, a second recessed portion, a first accommodating portion, and a plurality of second accommodating portions. The first side, the second side, the third side, and the fourth side are respectively opposite to the first surface, the second surface, the third surface, and the fourth surface. The first recessed portion is recessed from the first side along a second direction away from the first surface, the second recessed portion is recessed from the third side along the second direction away from the third surface. The first accommodating portion and the second accommodating portions pass through the movable portion along the first direction. When viewed along a third direction, the first accommodating portion and the second accommodating portions at least partially overlap. The second direction is perpendicular to the first direction, and the third direction is perpendicular to the first direction and the second direction.

According to some embodiments of the present disclosure, the connecting assembly includes a first elastic element, and the first elastic element has a first segment, a second segment, a third segment, a first bending portion, a second bending portion, a first connecting portion, and a second connecting portion, wherein the first segment is connected to the second segment via the first bending portion, and the second segment is connected to the third segment via, the second bending portion. The first connecting portion connects the first segment and the fixed portion, and the second connecting portion connects the third segment and the movable portion. The first segment, the second segment, and the third segment are not parallel to each other. The first bending portion has a first bending angle, the second bending portion has a second bending angle, and the first bending angle is smaller than the second bending angle. The first segment has a first length, the second segment has a second length, and the third segment has a third length. The first length is longer than the second length, and the third length is longer than the second length.

According to some embodiments of the present disclosure, at least one of the first segment and the second segment of the first elastic element and the second elastic element is provided with a hollow pattern.

According to some embodiments of the present disclosure, the driving assembly includes a driving magnet group and a driving coil group. The driving magnet group is disposed on the first accommodating portion of the movable portion. The driving coil group is disposed on the base of the fixed portion, and partially accommodated in the first accommodating portion. When viewed along the first direction, the driving magnet group and the driving coil group do not overlap.

According to some embodiments of the present disclosure, the driving magnet group includes at least two magnetic elements, which are symmetrically disposed on two inner walls of the first accommodating portion. Each of the two magnetic elements includes at least three magnetic units, and the magnetic units are arranged along the third direction. The magnetic pole directions of any two adjacent magnetic units are different.

According to some embodiments of the present disclosure, the driving coil set includes a first coil, a second coil, and a magnetic permeable element. The first coil and the second coil are wound around the magnetic permeable element. The magnetic permeable element has a shaft portion and a partition portion, the shaft portion extends along the third direction, and the partition portion separates the first coil and the second coil. A first winding direction of the first coil is different from a second winding direction of the second coil.

According, to some embodiments of the present disclosure, the driving assembly further includes a magnetic permeable plate, which has a rectangular shape and is disposed between the movable portion and the top surface of the upper cover. When viewed along the first direction, the magnetic permeable plate at least partially overlaps with the driving magnet group.

According to some embodiments of the present disclosure, the haptic feedback system further includes a circuit element and a position sensing assembly, and the movable portion is controlled in a closed loop by the circuit element and the position sensing assembly. The circuit assembly includes a circuit board, which is disposed on the base of the fixed portion. The position sensing assembly is connected to the circuit board and senses the movement of the movable portion relative to the fixed portion. The position sensing assembly includes a reference element and a position sensing element. The reference element is disposed on the movable portion, and the position sensing element is disposed on the circuit board. The reference element and the position sensing element at least partially overlap when viewed in the first direction.

According to some embodiments of the present disclosure, the haptic feedback system further includes a plurality of buffer elements disposed between the fixed portion and the movable portion.

According to some embodiments of the present disclosure, when viewed along the first direction, the first accommodating portion of the movable portion is rectangular, and four of the buffer elements are disposed at four corners of the first accommodating portion.

According to some embodiments of the present disclosure, one of the buffer elements is disposed between the first recessed portion of the movable portion and the connecting assembly.

According to some embodiments of the present disclosure, the haptic feedback system further includes a plurality of damping elements disposed between the fixed portion and the movable portion.

According, to some embodiments of the present disclosure, at least one of the damping elements is disposed between the movable portion and the base.

According to some embodiments of the present disclosure, at least one of the damping elements is disposed between the movable portion and a coil of the driving assembly.

According to some embodiments of the present disclosure, the movable portion further includes a plurality of counterweight elements, which are respectively disposed in the second accommodating portions.

According to some embodiments of the present disclosure, the counterweight elements and the main body are made of different materials.

According to some embodiments of the present disclosure, wherein the movable portion has a first natural frequency, when the driving assembly drives the movable portion with a first exciting frequency which is equal to the first natural frequency, the movable portion has a first mode of vibration relative to the fixed portion, and moves along the first mode direction. The movable portion further has a second natural frequency, when the driving assembly drives the movable portion with a second exciting frequency which is equal to the second natural frequency, the movable portion has a second mode of vibration relative to the fixed portion, and move along the second mode direction. The first mode direction is different from the second mode direction, and the first mode direction is not parallel to the second mode direction.

According, to some embodiments of the present disclosure, the driving direction is not parallel to the first mode direction and the second mode direction. The driving direction is not perpendicular to the first mode direction and the second mode direction. The driving direction is perpendicular to the first direction. The first mode direction and the second mode direction are perpendicular to the first direction.

BRIEF DESCRIPTION OF THE DRAWINGS

Aspects of this disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE DISCLOSURE

Figure 1:
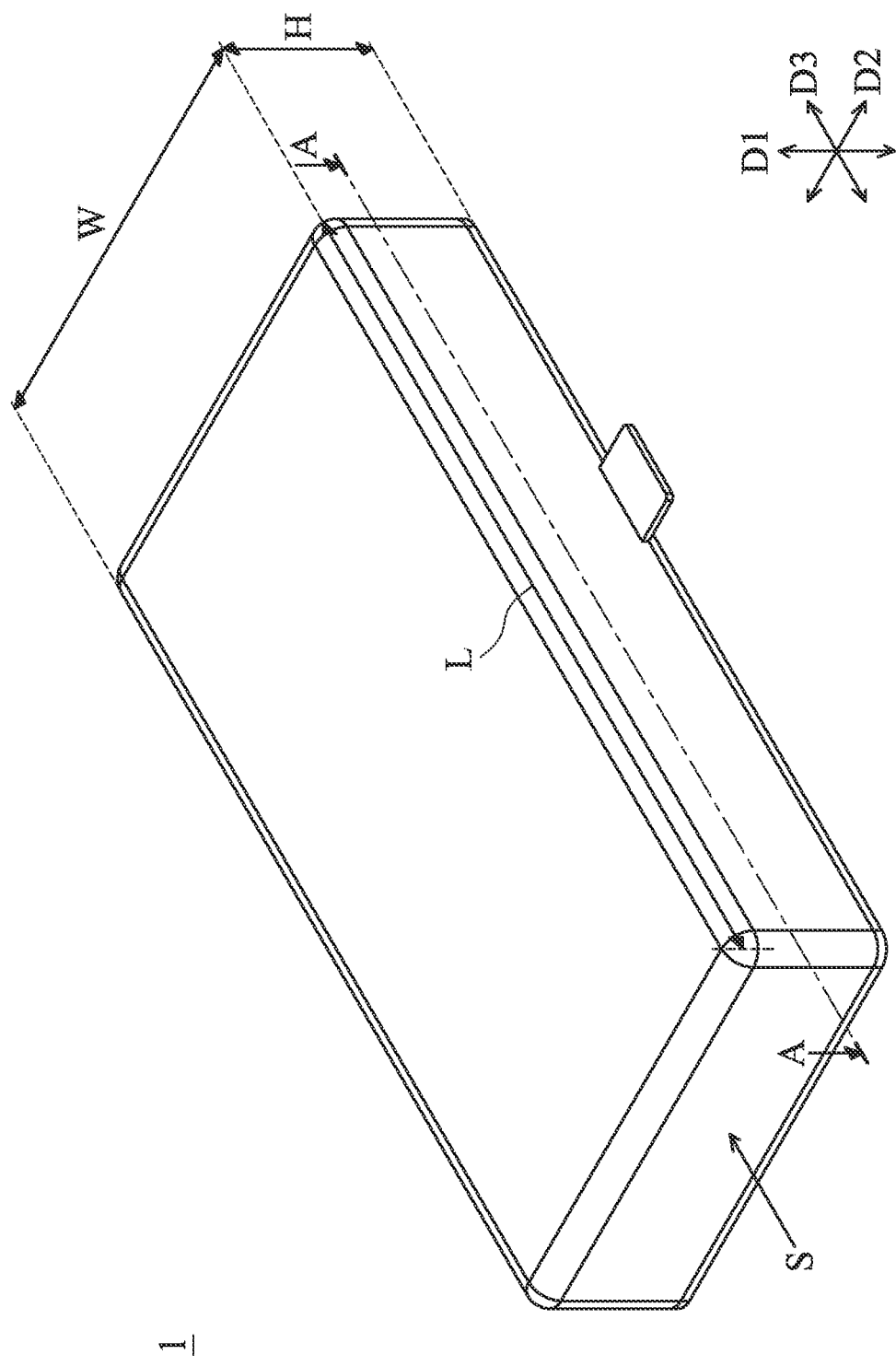
FIG. 1 is a perspective view of a haptic feedback system according to an embodiment of the present disclosure.

In the following detailed description, for the purposes of explanation, numerous specific details and embodiments are set forth in order to provide a thorough understanding of the present disclosure. The specific elements and configurations described in the following detailed description are set firth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

It should be understood that when an element is referred to as being "connected to" or "coupled to" another element, the element may be directly connected or coupled to another element, or there are one or more elements between the two elements. In addition, the use of ordinal numbers such as first, second, and third does not necessarily imply a sense of order, but can be multiple instances to distinguish actions or structures.

Reference to "one embodiment" or "an embodiment" throughout the specification means that particular features, structures, or characteristics described in conjunction with the embodiment are included in at least one embodiment. Therefore, the sentences "in one embodiment" or "in an embodiment" appearing in various places throughout the specification do not necessarily all refer to the same embodiment. In addition, in one or more embodiments, specific features, structures, or characteristics may be combined in any suitable manner.

Figure 2:
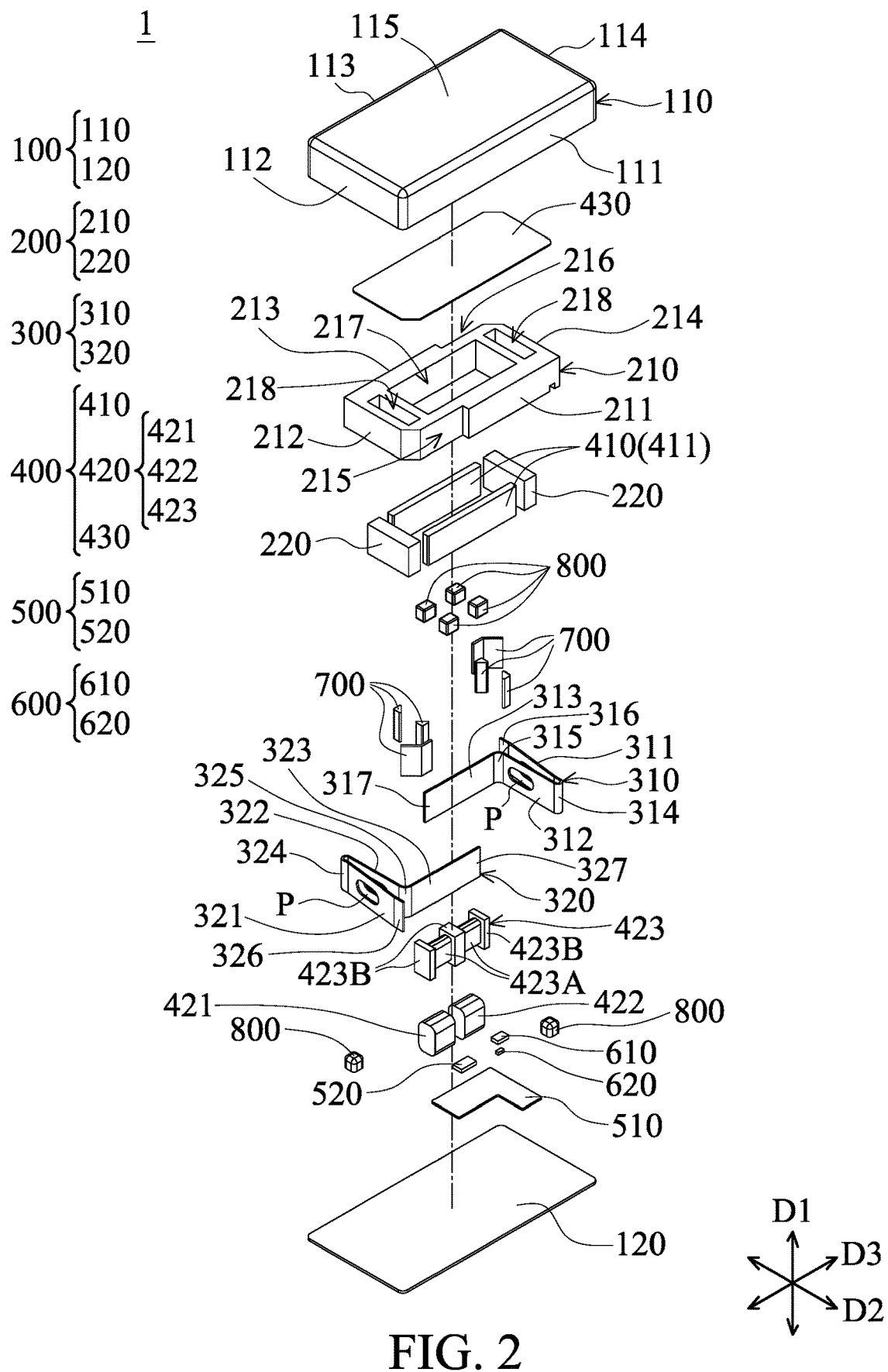
FIG. 2 is an exploded view of a haptic feedback system according to an embodiment of the present disclosure.
Figure 3:
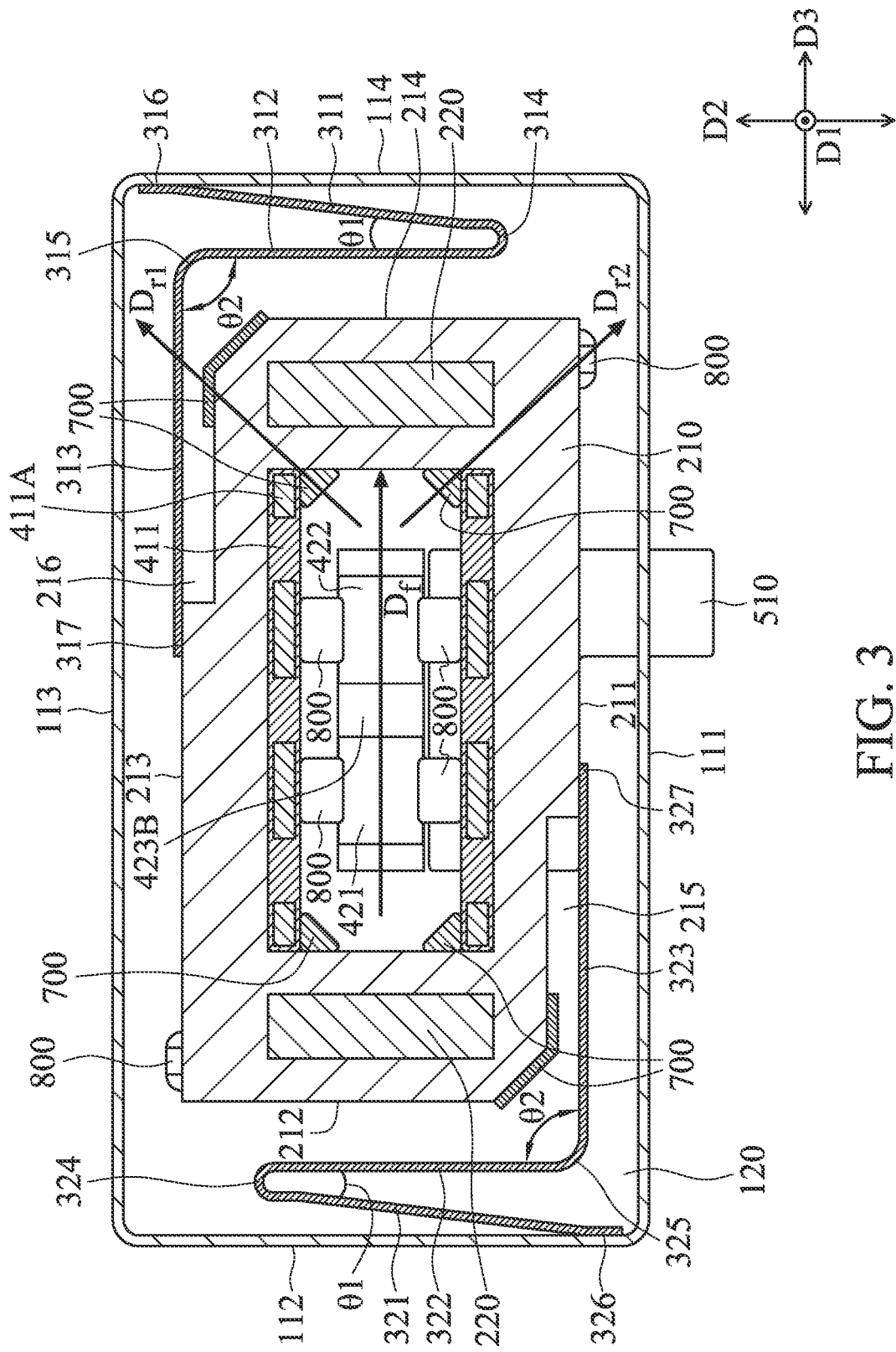
FIG. 3 is a cross-sectional view of the haptic feedback system cut along the line A-A in FIG. 1.

First, refer to FIG. 1 to FIG. 3. FIG. 1 is a perspective view of a haptic feedback system 1 according to an embodiment of the present disclosure. FIG. 2 is an exploded view of a haptic feedback system 1 according to an embodiment of the present disclosure. FIG. 3 is a cross-sectional view of the haptic feedback system cut along the line A-A in FIG. 1. The haptic feedback system 1 may be widely set in various devices, such as smart phones, wearable devices, gamepads, game consoles, tablets, etc., so that the devices may use the vibration of the haptic feedback system 1 as information feedback. The haptic feedback system 1 includes a fixed portion 100, a movable portion 200, a connecting assembly 300, a driving assembly 400, a circuit assembly 500, a position sensing assembly 600, a plurality of buffer elements 700, and a plurality of damping elements 800.

The fixed portion 100 is fixedly connected to any of the above-mentioned devices, and includes an upper cover 110 and a base 120. The upper cover 110 has a first surface 111, a second surface 112, a third surface 113, a fourth surface 114, and a top surface 115. The first surface 111 is opposite to the third surface 113, and the second surface 112 is opposite to the fourth surface 114. The top surface 115 is rectangular and has a length L and a width W. The first surface 111, the second surface 112, the third surface 113, and the fourth surface 114 have a height H. The first surface 111, the second surface 112, the third surface 113, and the fourth surface 114 extend from the top surface 115 along a first direction D1 toward the base 120. The height H is smaller than the length L and the width W. Therefore, the haptic feedback system is formed to a flat structure, which is beneficial to the miniaturization of the device.

The movable portion 200 is movable relative to the fixed portion 100 along a first mode direction Dr1 and a second mode direction Dr2, and is movably connected to the fixed portion 100 via the connecting assembly 300, The movable portion 200 includes a main body 210 and a plurality of counterweight elements 220. The main body 210 is disposed inside the upper cover 110 and has a first side 211, a second side 212, a third side 213, a fourth side 214, a first recessed portion 215, a second recessed portion 216, a first accommodating portion 217, and a plurality of second accommodating portions 218. The first side 211, the second side 212, the third side 213, and the fourth side 214 are respectively opposite to the first surface 111, the second surface 112, the third surface 113, and the fourth surface 114.

The first recessed portion 215 is recessed from the first side 211 along a second direction D2 away from the first surface 111, and the second recessed portion 216 is recessed from the third side 213 along the second direction D2 away from the third surface 113. The first accommodating portion 217 and the second accommodating portions 218 pass through the movable portion 200 along the first direction D1. When viewed along a third direction D3, the first accommodating portion 217 and the second accommodating portions 218 at least partially overlap. The second direction D2 is perpendicular to the first direction D1, and the third direction D3 is perpendicular to the first direction D1 and the second direction D2.

The counterweight elements 220 are respectively disposed in the second accommodating portions 218. The counterweight elements 220 and the main body 210 are made of different materials. For example, the weight element 220 may be made of high density metal, such as an alloy containing tungsten (W) or any other suitable material, while the body 210 may be made of, for example, plastic or any other suitable material. With the arrangement of the counterweight element 220, sufficient mass may be configured in a limited space, so that the movable portion 200 may operate in a required mode of vibration, thereby enhancing the vibration feedback felt by the user.

The connecting assembly 300 includes a first elastic element 310 and a second elastic element 320. The first elastic element 310 has a first segment 311, a second segment 312, a third segment 313, a first bending portion 314, a second bending portion 315, a first connecting portion 316, and a second connecting portion 317. The first segment 311 is connected to the second segment 312 via the first bending portion 314, and the second segment 312 is connected to the third segment 313 via the second bending portion 315. The first connecting portion 316 connects the first segment 311 and the fixed portion 100, and the second connecting portion 317 connects the third segment 313 and the movable portion 200.

The first segment 311, the second segment 312, and the third segment 313 are not parallel to each other. The first bending portion 314 has a first bending angle θ1, and the second bending portion 315 has a second bending angle θ2. The first segment 311 has a first length, the second segment 312 has a second length, and the third segment 313 has a third length. In some embodiments, the first bending angle θ1 is smaller than the second bending angle θ2, and the first length is longer than the second length, and the third length is longer than the second length, but not limited this, which may be changed as required.

The second elastic element 320 has the same structure as the first elastic element 310, and has a first segment 321, a second segment 322, a third segment 323, a first bending portion 324, a second bending portion 325, a first connecting portion 326, and a second connecting portion 327. When viewed along the first direction D1, the first elastic element 310 and the second elastic element 320 are symmetrically disposed.

In more detail, the first connecting portion 316 of the first elastic element 310 is connected to the fourth surface 114 of the upper cover 110, and the second connecting portion 317 of the first elastic element 310 is connected to the third surface 113 of the upper cover 110. The first connecting portion 326 of the second elastic element 320 is connected to the second surface 112 of the upper cover 110, and the second connecting portion 327 of the second elastic element 320 is connected to the first surface 111 of the upper cover 110. The first segment 311 and the second segment 312 of the first elastic element 310 are disposed between the fourth surface 114 of the upper cover 110 and the fourth side 214 of the movable portion 200. The third segment 313 of the first elastic element 310 is disposed between the third surface 113 of the upper cover 110 and the second recessed portion 216 of the movable portion 200. The first segment 321 and the second segment 322 of the second elastic element 320 are disposed between the second surface 112 of the upper cover 110 and the second side 212 of the movable portion 200. The third segment 323 of the second elastic element 320 is disposed between the first surface 111 of the upper cover 110 and the first recessed portion 215 of the movable portion 200.

In some embodiments, at least one of the first segments 311, 321 and the second segments 312, 322 of the first elastic element 310 and the second elastic element 320 is provided with a hollow pattern P. In some embodiments, the first segments 311, 321 and the second segments 312, 322 are all provided with hollow patterns P, so as to adjust the resonance frequency and vibration response of the first elastic element 310 and the second elastic element 320.

Figure 4:
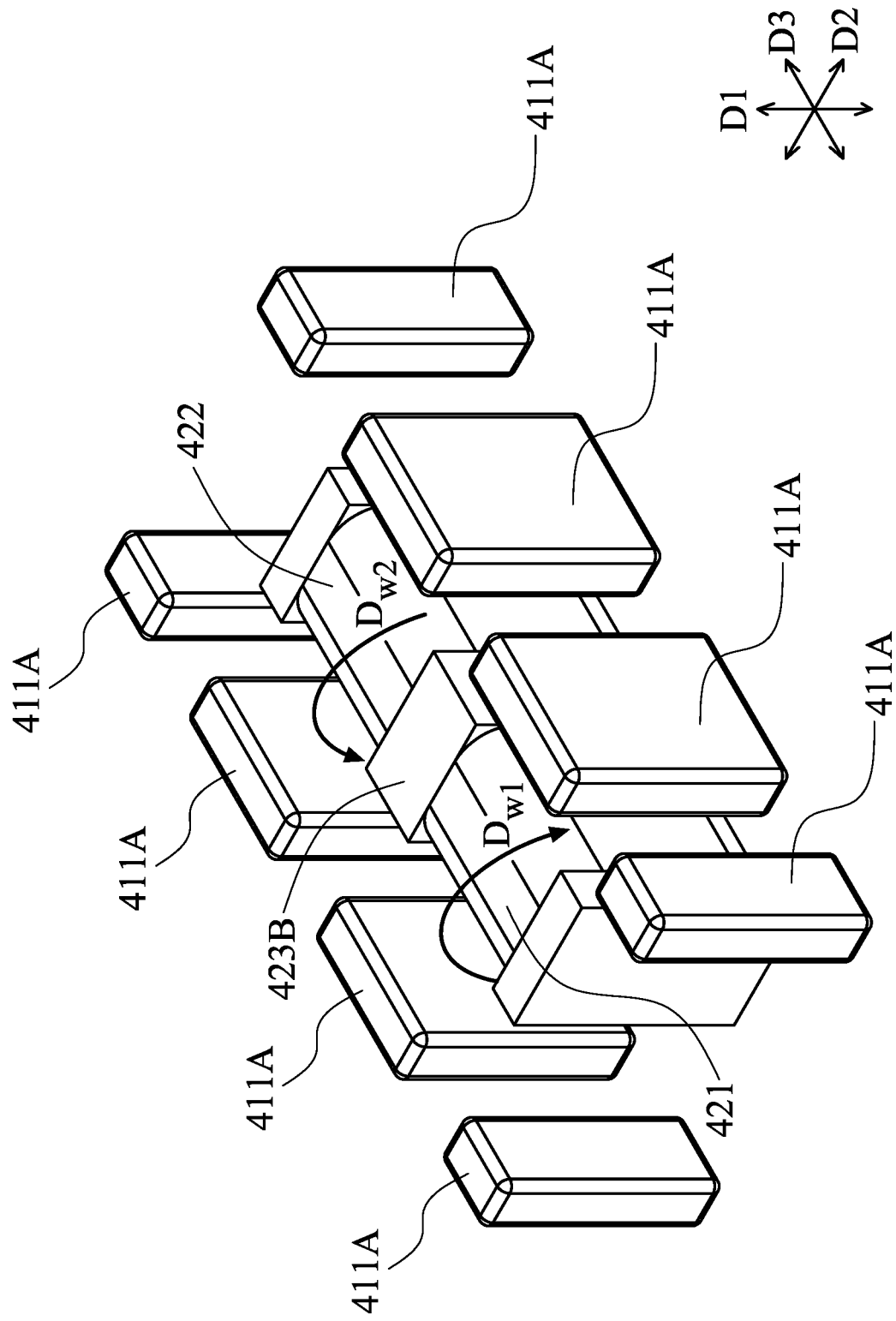
FIG. 4 is a schematic diagram of partial elements of a haptic feedback system according to an embodiment of the present disclosure.

Next, refer to FIG. 1 to FIG. 4. FIG. 4 is a schematic diagram of partial elements of a haptic feedback system 1 according to an embodiment of the present disclosure. The driving assembly 400 drives the movable portion 200 to move relative to the fixed portion 100 by a driving force, wherein a driving direction Df of the driving force is different from the first mode direction Dr1 and the second mode direction Dr2, which will be described in detail later. The driving assembly 400 includes a driving magnet group 410, a driving coil group 420, and a magnetic permeable plate 430. The driving magnet group 410 is disposed on the first accommodating portion 217 of the movable portion 200, and the driving coil group 420 is disposed on the base 120 of the fixed portion 100 and partially accommodated in the first accommodating portion 217. When viewed along the first direction D1, the driving magnet group 410 and the driving coil group 420 do not overlap.

The driving magnet group 410 includes at least two magnetic elements 411, which are symmetrically disposed on two inner walls of the first accommodating portion 217. Each of the two magnetic elements 411 includes at least three magnetic units 411A, as shown in FIG. 4. FIG. 4 is a schematic diagram showing the configuration of the magnetic units 411A disposed in the magnetic element 411 and the driving coil set 420. The magnetic units 411A are arranged along the third direction D3. The magnetic pole directions of any two adjacent magnetic units 411A are different.

The driving coil set 420 includes a first coil 421, a second coil 422, and a magnetic permeable element 423. The first coil 421 and the second coil 422 are wound around the magnetic permeable element 423. The magnetic permeable element 423 has a shaft portion 423A and a partition portion 423B. The shaft portion 423A extends along the third direction D3, and the partition portion 423B separates the first coil 421 from the second coil 422. A first winding direction Dw1 of the first coil 421 is different from a second winding direction Dw2 of the second coil 422. For example, in some embodiments, one of the first coil 421 and the second coil 422 winds around the shaft portion 423A in a clockwise direction, and the other one of the first coil 421 and the second coil 422 winds around the shaft portion 423A in a counterclockwise direction. With the configuration of the magnetic unit 411A, the first coil 421 and the second coil 422, the magnetic field along the third direction 173 may be stronger, thereby making the driving force along the third direction D3 larger. Therefore, a vibration amplitude may be increased.

The magnetic permeable plate 430 has a rectangular shape and is disposed between the movable portion 200 and the top surface 115 of the upper cover 110 for magnetic permeability. In addition, the magnetic permeable plate 430 may be used as a bearing surface of the movable portion 200 relative to the upper cover 110. The magnetic field may be increased with the magnetic permeable plate 430, so that the driving force may be increased, and the vibration amplitude may be increased. Moreover, it may also make it easier to assemble the driving magnet group 410 and the counterweight elements 220. When viewed along the first direction D1, the magnetic permeable plate 430 at least partially overlaps with the driving magnet group 410.

The circuit assembly 500 and the position sensing assembly 600 are used to control the movable portion 200 in closed-loop. The circuit assembly 500 includes a circuit board 510 and a plurality of IC elements 520 (for simplicity, only one IC element 520 is shown in FIG. 2) disposed on the circuit board 510. The circuit board 510 is disposed on the base 120 of the fixed portion 100. The position sensing assembly 600 is connected to the circuit board 510 and senses the movement of the movable portion 200 relative to the fixed portion 100, and includes a reference element 610 and a position sensing element 620. In some embodiments, the reference element 610 is a magnetic element disposed on the movable portion 200, and the position sensing element 620 may be, for example, a Hall effect sensor, a magnetic resistance sensor, or a Fluxgate, etc., and is disposed on the circuit board 510 to sense the magnetic field of the reference element 610 disposed on the movable portion 200, so as to obtain the position of the movable portion 200 relative to the fixed portion 100, The reference element 610 and the position sensing element 620 at least partially overlap when viewed along the first direction D1.

Figure 5:
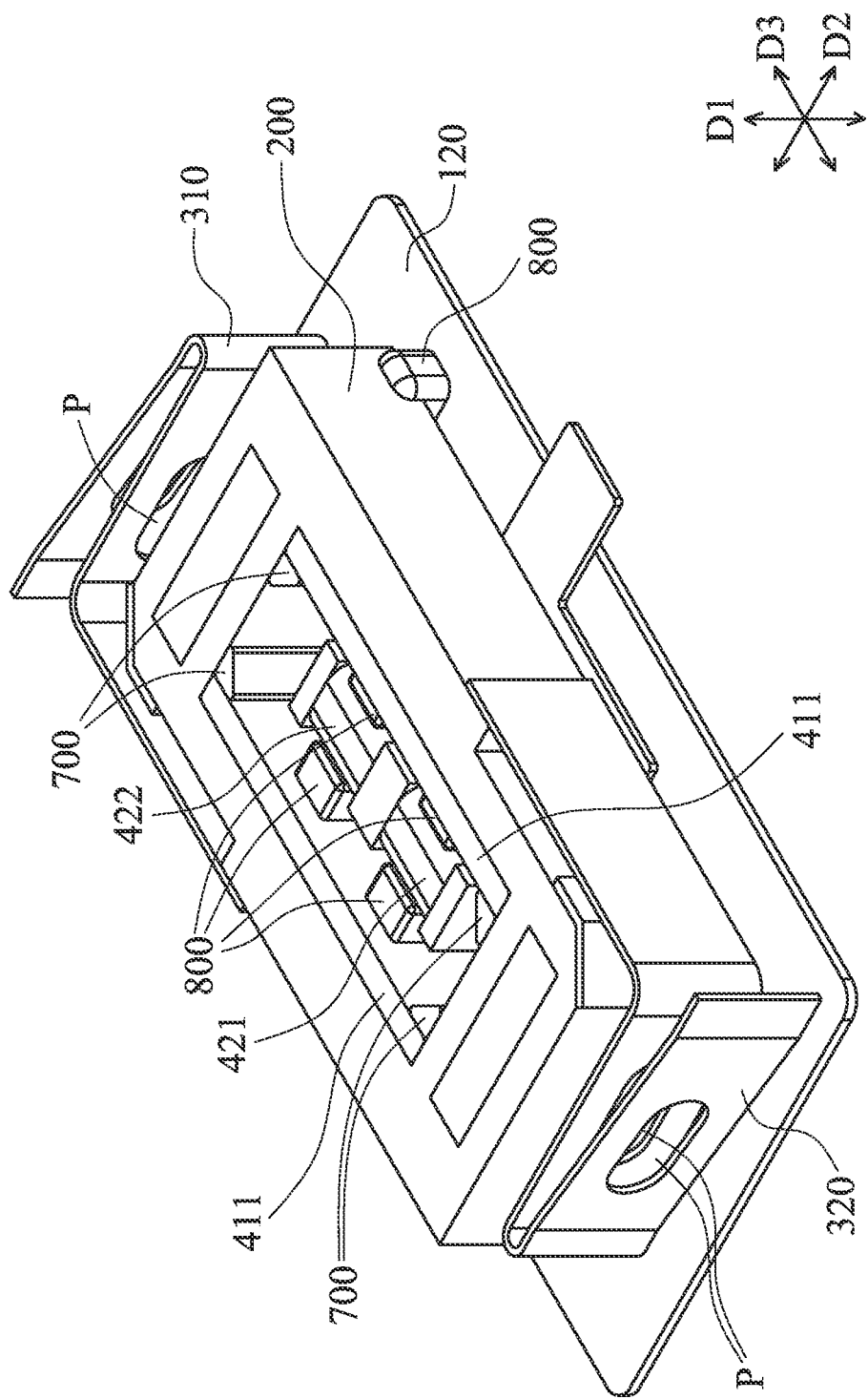
FIG. 5 is a schematic diagram of partial elements of a haptic feedback system according to an embodiment of the present disclosure.

Next, refer to FIG. 2, FIG. 3, and FIG. 5. FIG. 5 is a schematic diagram of partial elements of a haptic feedback system 1 according to an embodiment of the present disclosure. The buffer elements 700 may include gel or damping oil to reduce impact damage or noise generated when the haptic feedback system 1 operates. The buffer elements 700 are disposed between the fixed portion 100 and the movable portion 200. For example, when viewed along the first direction D1, the first accommodating portion 217 of the movable portion 200 is a rectangle, and four of the buffer elements 700 may be disposed at four corners of the first accommodating portion 217 to prevent the movable portion 200 directly strikes the driving coil set 420 disposed on the fixed portion 100.

In addition, by the configuration of the first recessed portion 215 and the second recessed portion 216, there is a buffer distance between the connecting assembly 300 and the movable portion 200. In addition, two corners of the movable portion 200 close to the connecting assembly 300 are designed to be a non-right angle, and one of the buffer elements 700 is disposed between the first recessed portion 215 (and/or the second recessed portion 216) of the movable portion 200 and the connecting assembly 300 (two corners described above), which may prevent the movable portion 200 from hitting the connecting assembly 300 and breaking the connecting assembly 300.

The damping elements 800 may include gel or damping oil, etc., to accelerate the response speed of the haptic feedback system 1, so that the haptic feedback system 1 may achieve the effect of quick start and quick stop. The damping elements 800 are disposed between the fixed portion 100 and the movable portion 200. For example, at least one of the damping elements 800 may be disposed between the movable portion 200 and the base 120. And at least one of the damping elements 800 may be disposed between the movable portion 200 and the first coil 421 (and/or the second coil 422) of the driving assembly 400.

Next, the operation of the haptic feedback system 1 will be described with reference to FIG. 3. The movable portion 200 has a first natural frequency (more specifically, the combination of the movable portion 200 and the connecting assembly 300 has a first natural frequency), when the driving assembly 400 drives the movable portion 200 at a first exciting frequency, and when the first exciting frequency is equal to the first natural frequency, the movable portion 200 has a first mode of vibration relative to the fixed portion 100 and moves along the first mode direction Dr1.

In addition, the movable portion 200 has a second natural frequency (more specifically, the combination of the movable portion 200 and the connecting assembly 300 has a second natural frequency), when the driving assembly 400 drives the movable portion 200 with a second exciting frequency, and when the second exciting frequency is equal to the second natural frequency, the movable portion 200 has a second mode of vibration relative to the fixed portion 100 and moves along the second mode direction Dr2.

As mentioned above, the mass of the counterweight element 220 of the movable portion 200 can be changed, or the hollow pattern P or the thickness of the connecting assembly 300 can be changed, thereby changing natural frequencies of the combination of the movable portion 200 and the connecting assembly 300. In this embodiment, the above variable factors are controlled so that the first mode direction Dr1 and the second mode direction Dr2 are different and not parallel. More specifically, the first mode direction Dr1 and the second mode direction Dr2 are perpendicular to the first direction D1. In addition, in this embodiment, the driving direction Df is perpendicular to the first direction D1, and the driving direction Df is neither parallel nor perpendicular to the first mode direction Dr1 and the second mode direction Dr2.

The movable portion 200 is subjected to two kinds of forces during the movement. One is the driving force, which is caused by the mutual interaction of magnetic fields between the driving magnet group 410 disposed on the movable portion 200 and the driving coil group 420 disposed on the fixed portion 100. The other one is the elastic restoring force of the first elastic element 310 and the second elastic element 320, and the elastic restoring force generated by the deformation of the first elastic element 310 and the second elastic element 320 under the movement of the movable portion 200.

In this embodiment, by the structural design of the first elastic element 310 and the second elastic element 320, that is, the first elastic element 310 and the second elastic element 320 respectively have the first segment 311, 321, the second segments 312, 322, and the third segments 313, 323, so that the first elastic element 310 and the second elastic element 320 are bent and deformed by the movement of the movable portion 200. Therefore, there is a deformed component in the direction that is parallel to the driving force while there is another deformed component in the direction that is perpendicular to the driving force. Thus, when the driving force is applied to the movable portion 200 by the driving assembly 400, even if the driving direction Df of the driving force is not along the first mode direction Dr1 or the second mode direction Dr2, the movable portion 200 may move along the first mode direction Dr1 at the first exciting frequency and may move along the second mode direction Dr2 at the second exciting frequency because of the structure of the connecting assembly 300 mentioned above. Therefore, vibration in multiple directions may be generated by only one haptic feedback system 1, thus enhancing functions of the device, and light weight and low cost may be achieved.

In addition, the extension length, the first bending angle θ1, and the second bending angle θ2 of the first segment 311, 321, the second segment 312, 322, and the third segment 313, 323 may also affect components of the vibration amplitude of the movable portion 200 in the second direction D2 and the third direction D3. Therefore, changing the length and angle between the segments may make the haptic feedback system 1 meet the components of vibration amplitude in different directions required by the device, thereby achieving custom products.

To sum up, the present disclosure provides a haptic feedback system, which is disposed in a device and includes a fixed portion, a movable portion, a connecting assembly, and a driving assembly. The fixed portion fixedly connects the device. The movable portion is movable along a first mode direction and a second mode direction relative to the fixed portion. The movable portion is movably connected to the fixed portion via the connecting assembly. The driving assembly drives the movable portion to move relative to the fixed portion by a driving force. The haptic feedback system of the present disclosure may make the movable portion move along the first mode direction or the second mode direction by the driving force along the same driving direction.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A haptic feedback system, set in a device, comprising:
a fixed portion, fixedly connected to the device;
a movable portion, movable along a first mode direction and a second mode direction relative to the fixed portion;
a connecting assembly, wherein the movable portion is movably connected to the fixed portion via the connecting assembly; and
a driving assembly, driving the movable portion to move relative to the fixed portion by a driving force, wherein a driving direction of the driving force is different from the first mode direction and the second mode direction,
wherein the movable portion comprises a first accommodating portion and a plurality of second accommodating portions,
wherein the second accommodating portions pass through the movable portion along a first direction, and when viewed along a third direction that is perpendicular to the first direction, the first accommodating portion and the second accommodating portions at least partially overlap.

2. The haptic feedback system as claimed in claim 1, wherein the fixed portion comprises an upper cover and a base, and the upper cover has a first surface, a second surface, a third surface, a fourth surface, and a top surface, wherein the top surface is rectangular, and has a length and a width, wherein the first surface, the second surface, the third surface, and the fourth surface have a height, extending from the top surface along the first direction toward the base, wherein the height is less than the length and the width, wherein the first surface is opposite to the third surface, and the second surface is opposite to the fourth surface;

wherein the movable portion comprises a main body, disposed inside the upper cover, having a first side, a second side, a third side, a fourth side, a first recessed portion, a second recessed portion, the first accommodating portion, and the plurality of second accommodating portions, wherein the first side, the second side, the third side, and the fourth side are respectively opposite to the first surface, the second surface, the third surface, and the fourth surface;

wherein the first recessed portion is recessed from the first side along a second direction away from the first surface, and the second recessed portion is recessed from the third side along the second direction away from the third surface;

wherein the first accommodating portion passes through the movable portion along the first direction;

wherein the second direction is perpendicular to the first direction and the third direction.

3. The haptic feedback system as claimed in claim 2, wherein the connecting assembly comprises a first elastic element, and the first elastic element has a first segment, a second segment, and a third segment, a first bending portion, a second bending portion, a first connecting portion, and a second connecting portion, wherein:

the first segment is connected to the second segment via the first bending portion, and the second segment is connected to the third segment via the second bending portion;

the first connecting portion connects the first segment and the fixed portion, and the second connecting portion connects the third segment and the movable portion;

the first segment, the second segment, and the third segment are not parallel to each other; the first bending portion has a first bending angle, and the second bending portion has a second bending angle, and the first bending angle is smaller than the second bending angle;

the first segment has a first length, the second segment has a second length, the third segment has a third length, the first length is longer than the second length, and the third length is longer than the second length.

4. The haptic feedback system as claimed in claim 3, wherein the connecting assembly further comprises a second elastic element, the second elastic element has the same structure as the first elastic element, and has a first segment, a second segment, a third segment, a first bending portion, a second bending portion, a first connecting portion, and a second connecting portion, wherein when viewed along the first direction, the first elastic element and the second elastic element are symmetrically arranged;

wherein the first connecting portion of the first elastic element is connected to the fourth surface of the upper cover, the second connecting portion of the first elastic element is connected to the third surface of the upper cover, and the first connecting portion of the second elastic element is connected to the second surface of the upper cover, and the second connecting portion of the second elastic element is connected to the first surface of the upper cover;

wherein the first segment and the second segment of the first elastic element are disposed between the fourth surface of the upper cover and the fourth side of the movable portion;

wherein the third segment of the first elastic element is disposed between the third surface of the upper cover and the second recessed portion of the movable portion;

wherein the first segment and the second segment of the second elastic element are disposed between the second surface of the upper cover and the second side of the movable portion;

wherein the third segment of the second elastic element is disposed between the first surface of the upper cover and the first recessed portion of the movable portion.

5. The haptic feedback system as claimed in claim 4, wherein at least one of the first segment and the second segment of the first elastic element and the second elastic element is provided with a hollow pattern.

6. The haptic feedback system as claimed in claim 2, wherein the driving assembly comprises a driving magnet group and a driving coil group, the driving magnet group is disposed on the first accommodating portion of the movable portion, the driving coil group is disposed on the base of the fixed portion, and the driving coil group is partially accommodated in the first accommodating portion;

wherein when viewed along the first direction, the driving magnet group and the driving coil group do not overlap.

7. The haptic feedback system as claimed in claim 6, wherein the driving magnet group comprises at least two magnetic elements, which are symmetrically disposed on the two inner walls of the first accommodating portion;

wherein each of the two magnetic elements comprises at least three magnetic units, and the magnetic units are arranged along the third direction;

wherein the magnetic pole directions of any two adjacent magnetic units are different.

8. The haptic feedback system of claim 6, wherein the driving coil group comprises a first coil, a second coil, and a magnetic permeable element, the first coil and the second coil are wound around the magnetic permeable element;

wherein the magnetic permeable element has a shaft portion and a partition portion, the shaft portion extends along the third direction, and the partition portion separates the first coil and the second coil;

wherein a first winding direction of the first coil is different from a second winding direction of the second coil.

9. The haptic feedback system as claimed in claim 6, wherein the driving assembly further comprises a magnetic permeable plate with a rectangular shape, disposed between the movable portion and the top surface of the upper cover;

wherein when viewed along the first direction, the magnetic permeable plate at least partially overlaps with the driving magnet group.

10. The haptic feedback system as claimed in claim 2, further comprising a circuit assembly and a position sensing assembly, and the movable portion is controlled in a closed loop by the circuit assembly and the position sensing assembly;

wherein the circuit assembly comprises a circuit board disposed on the base of the fixed portion;

wherein the position sensing assembly is connected with the circuit board, and senses the movement of the movable portion relative to the fixed portion, comprising:

a reference element, disposed in the movable portion; and a position sensing element, disposed on the circuit board, wherein when viewed along the first direction, the reference element and the position sensing element at least partially overlap.

11. The haptic feedback system as claimed in claim 2, further comprising a plurality of buffer elements disposed between the fixed portion and the movable portion.

12. The haptic feedback system as claimed in claim 11, wherein when viewed along the first direction, the first accommodating portion of the movable portion is rectangular, and four of the buffer elements are disposed on the four corners of the first accommodating portion.

13. The haptic feedback system as claimed in claim 11, wherein one of the buffer elements is disposed between the first recessed portion of the movable portion and the connecting assembly.

14. The haptic feedback system as claimed in claim 2, further comprising a plurality of damping elements disposed between the fixed portion and the movable portion.

15. The haptic feedback system as claimed in claim 14, wherein at least one of the damping elements is disposed between the movable portion and the base.

16. The haptic feedback system as claimed in claim 14, wherein at least one of the damping elements is disposed between the movable portion and a coil of the driving assembly.

17. The haptic feedback system as claimed in claim 2, wherein the movable portion further comprises a plurality of counterweight elements, which are respectively disposed in the second accommodating portions.

18. The haptic feedback system of claim 17, wherein the counterweight elements and the main body are made of different materials.

19. The haptic feedback system of claim 2, wherein the movable portion has a first natural frequency, when the driving assembly drives the movable portion with a first exciting frequency, and the first exciting frequency is equal to the first natural frequency, the movable portion has a first mode of vibration relative to the fixed portion, and moves along the first mode direction;

wherein the movable portion further has a second natural frequency, when the driving assembly drives the movable portion with a second exciting frequency and the second exciting frequency is equal to the second natural frequency, the movable portion has a second mode of vibration relative to the fixed portion, and moves along the second mode direction;

wherein the first mode direction is different from and not parallel to the second mode direction.

20. The haptic feedback system of claim 19, wherein the driving direction is not parallel to the first mode direction and the second mode direction;

wherein the driving direction is not perpendicular to the first mode direction and the second mode direction;

wherein the driving direction is perpendicular to the first direction;

wherein the first mode direction and the second mode direction are perpendicular to the first direction.

21. A haptic feedback system, set in a device, comprising:
a fixed portion, fixedly connected to the device;
a movable portion, movable along a first mode direction and a second mode direction relative to the fixed portion;
a connecting assembly, wherein the movable portion is movably connected to the fixed portion via the connecting assembly; and
a driving assembly, driving the movable portion to move relative to the fixed portion by a driving force, wherein a driving direction of the driving force is different from the first mode direction and the second mode direction,
wherein the movable portion has a first natural frequency, when the driving assembly drives the movable portion with a first exciting frequency, and the first exciting frequency is equal to the first natural frequency, the movable portion has a first mode of vibration relative to the fixed portion, and moves along the first mode direction;
wherein the movable portion further has a second natural frequency, when the driving assembly drives the movable portion with a second exciting frequency and the second exciting frequency is equal to the second natural frequency, the movable portion has a second mode of vibration relative to the fixed portion, and moves along the second mode direction;
wherein the first mode direction is different from and not parallel to the second mode direction.

* * * * *